(12) United States Patent
Asano et al.

(10) Patent No.: US 6,345,366 B1
(45) Date of Patent: Feb. 5, 2002

(54) METHOD AND DEVICE FOR ERROR RECOVERY (75) Inventors: Hideo Asano; Hiroaki Suzuki, both of Machida; Tatsuya Endo, Fujisawa; Isao Yoneda; Kazuyuki Kobayashi, both of Yokohama; Haruo Andoh, Zama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/555,035

(22) PCT Filed: Sep. 24, 1998

(86) PCT No.: PCT/JP98/04306

§ 371 Date: Jul. 17, 2000

§ 102(e) Date: Jul. 17, 2000

(87) PCT Pub. No.: WO00/17875

PCT Pub. Date: Mar. 30, 2000

(51) Int. Cl.⁷ ................................................. G06F 11/00
(52) U.S. Cl. ........................................... 714/2; 714/758
(58) Field of Search ...................... 714/2, 3, 5, 7, 714/8, 15, 16, 25, 41, 42, 48, 758, 798, 799; 360/77.04, 77.02; 711/114; 369/53

(56) References Cited

U.S. PATENT DOCUMENTS

| | | | | |
|---|---|---|---|---|
| 4,733,396 A | * | 3/1988 | Baldwin et al. | 714/764 |
| 4,937,688 A | * | 6/1990 | Sengoku | 360/69 |
| 5,163,162 A | * | 11/1992 | Berry et al. | 369/43 |
| 5,274,646 A | * | 12/1993 | Brey et al. | 714/758 |
| 5,701,314 A | * | 12/1997 | Armstrong et al. | 714/765 |
| 5,856,983 A | * | 1/1999 | Okazaki | 371/21.4 |
| 5,898,532 A | * | 4/1999 | Du et al. | 360/46 |
| 5,918,001 A | * | 6/1999 | Ueno et al. | 714/8 |
| 5,995,317 A | * | 11/1999 | Ottesen | 360/77.04 |
| 6,061,805 A | * | 5/2000 | Suzuki et al. | 714/2 |
| 6,118,608 A | * | 9/2000 | Kakihara et al. | 360/53 |

* cited by examiner

*Primary Examiner*—Nadeem Iqbal
(74) *Attorney, Agent, or Firm*—G. Marlin Knight; Bracewell & Patterson, L.L.P.

(57) ABSTRACT

An Error Recover Procedure (ERP) is disclosed which, during execution of the ERP, while self-diagnosing the cause of error, dynamically changes the error recovery steps of the ERP. An appropriate ERP is selected and executed according to the detected error status.

7 Claims, 6 Drawing Sheets

METHOD AND DEVICE FOR ERROR RECOVERY

BACKGROUND OF THE INVENTION

1. Technical Field

The present invention is related to a storage device having an error recovery function. In particular, it is related to a disk storage device having an error recovery procedure (ERP) comprising a self-diagnostic feature.

2. Description of the Related Art

In disk storage devices, when reading data from a disk storage medium, defects of the disk and track mis-registration, etc. may result in read errors. When these errors occur, for a high readability, the error recovery procedure (ERP) comprising the error recovery steps, such as retry and change of parameters, is executed to repair the errors.

Usually, for the errors in the data area, the ECC (error correction code) which is a general error recovery code is used to execute the error recovery process. Furthermore, a variety of error recovery steps, such as change of reading gains, change of offtracks, and in the case where a magneto-resistive (MR) element is used as a reading head, change of bias values of the MR element, are executed. Once these error recovery steps are executed, the data is read again. If the rereading has succeeded, the data continues to be used. If the recovery by the error recovery procedure fails it results in hard error, or if the data can be re-recorded (reassigned) to another area, the area concerned on the disk is regarded as an unavailable area, and the data is reassigned to the other area.

The recent disk device utilizes a magneto-resistive head or giant MR (GMR) head. It reads data by utilizing the property of the MR element that its resistivity is changed due to the change of the magnetic field. However, one of the reading errors which occur in this method for reading the change of resistance is a Thermal Asperity (TA). The Thermal Asperity refers to a projection which is generated on the disk colliding against the reading head to cause the change of resistance due to the change of temperature to occur in the MR element. Thereby, an abnormal signal is generated.

As a countermeasure to the error for this Thermal Asperity, there is a method of changing the circuit by constant filtering of the output signal of the head (making the frequency response faster) to relatively shorten the TA waveform so as to be enabled to read. This is also configured as a portion of the above error recovery procedure (ERP).

For the errors in reading and writing data, there are a variety of countermeasures as mentioned above. They are usually stored as a series of steps of the ERP. Once the ERP is started, these steps are executed sequentially.

As mentioned above, there are a variety of factors of error generation. Therefore, the ERP which is effective for these various error factors is required. The ERP typically executes rereading by changing and adjusting one-by-one the standard reading conditions defined among the disk, magnetic head, and HDC (hard disk controller). Here, the reading conditions are, for example, an amount of the offtrack which is the amount of discrepancy between the center of the magnetic head and the center of the track, a value of the bias current supplied to the MR element in the case where the MR element is provided as the magnetic head, an adjustment of the automatic gain control (AGC) which is provided for the constant amplitude of the regenerated signal, and an adjustment of the speed of the PLL circuit for the stabilized sampling frequency, etc.

Usually, a plurality of error recovery steps are registered with the ERP. These steps are executed in a predetermined order. Each time each step is finished, retry (rereading) is executed. The ERP is finished when the retry has succeeded. If the retry has not succeeded, the ERP is finished when the preset maximum number of times of retry is reached, or the final step of the ERP is finished.

The ERP also comprises steps requiring considerable time to be executed. Executing all of these error recovery steps may take time of the order of from over ten seconds to several tens of seconds.

Conventionally, the time required to time out for a read instruction from the host system is typically about 30 seconds, but some recent systems time out earlier than that. Thus, some systems may be unable to execute all the steps of the ERP.

As a method for solving such a problem, in Published Unexamined Patent Application No. 10-134528, the applicant has suggested a method of changing the order of execution of each error recovery step based on the history of past errors. And, in Japanese Patent Application No. 8-307743, the applicant has suggested a method of continuing to execute the ERP until the final step even if the time out occurs.

However, the recent ERP comprises error recovery steps such as the initialization of the GMR element, which are effective only for particular errors, but if being executed too frequently, have a risk of facilitating the degradation of the head, etc. Such steps were registered as later steps in the ERP so as to reduce the frequency of the execution.

And, in the conventional ERPs, there was not an ERP which, during execution of the ERP, while self-diagnosing the cause of error, changes dynamically the error recovery steps.

On the other hand, in the case where errors occur when writing data to a sector, rewriting is executed after the execution of the ERP, and if writing is still not possible, the concerned data to be written will be reassigned to another sector. In this case, there are mainly two causes since the conventional ERPs are configured without reference to the precision of the Track Following: (1) Write Abort due to the TA and defects of the disk existing in a particular servo sector; and (2) Write Abort due to the degradation of the positioning of the head due to the RRO (Repeatable Run Out) component of the spindle motor.

In the case of (1), the probability that rewriting succeeds by the execution of the ERP is relatively low. It is more efficient to reassign immediately than to spend time to execute the ERP.

In the case of (2), differing from the case of (1), there is no defect which makes it physically impossible to write. The possibility that the writing succeeds by execution of the ERP and rewriting is relatively high. Therefore, the ERP should be executed until a certain step or the final step.

In the prior art, it is not possible to determine when either of the two cases as mentioned above is the cause of error. Therefore, the ERP was executed indiscriminately even if immediate reassigning should be executed as in the case of (1).

SUMMARY OF THE INVENTION

An object of the present invention is to provide an ERP which, during execution of the ERP, while self-diagnosing the cause of error, changes dynamically the error recovery steps.

Another object of the present invention is to provide an ERP which can recover from the errors adequately and in a short time (with a few steps) according to the cause of error.

Furthermore, another object of the present invention is to provide an ERP in which the execution of the error recovery steps unsuitable for the cause of error is eliminated, and the degradation of the head, etc. caused by that can be prevented.

Furthermore, another object of the present invention is to provide a means of determining the cause of error.

Furthermore, another object of the present invention is to provide a means of selecting whether or not to execute the ERP according to the cause of error.

Furthermore, another object of the present invention is to make the response of the disk storage device to the host system faster by reassigning without execution of the ERP, in the case of an error due to a particular cause.

According to the present invention, the error status is detected, and according to the detected error status, an appropriate ERP is selected and executed.

And, in another embodiment of the present invention, the precision of the Positioning is measured during the Track Following, and when the measured value is equal to or more than a certain value, it is determined that the RRO component resulted from the spindle, etc. is large, and the ERP continues to be executed. In the case where it is determined as a result of the measurement that the TA or the defect of the disk exists in a particular servo sector, the countermeasure to TA is taken, and if recovery is still not attained, the ERP is terminated, and reassigning is conducted.

Furthermore, the method according to the present invention for executing the ERP comprising a plurality of error recovery steps in the storage device comprises the steps of detecting the error status, selecting the error recovery steps in response to the detected error status, and executing the selected error recovery steps. The device according to the present invention for executing the ERP comprising a plurality of error recovery steps comprises the means of detecting the error status, selecting the error recovery steps in response to the detected error status, and executing the selected error recovery steps.

And furthermore, the method according to the present invention for executing the ERP comprising a plurality of error recovery steps in the storage device comprises the steps of measuring the servo stability, selecting the error recovery steps in response to the measured servo stability, and executing the selected error recovery steps. The device according to the present invention for executing the ERP comprising a plurality of error recovery steps comprises the means of measuring the servo stability, selecting the error recovery steps in response to the measured servo stability, and executing the selected error recovery steps.

BRIEF DESCRIPTION OF THE DRAWINGS

FIG. 2 (being comprised of FIG. 2A and FIG. 2B) shows the process according to the present invention for executing the ERP;

DETAILED DESCRIPTION OF A PREFERRED EMBODIMENT

Figure 1:
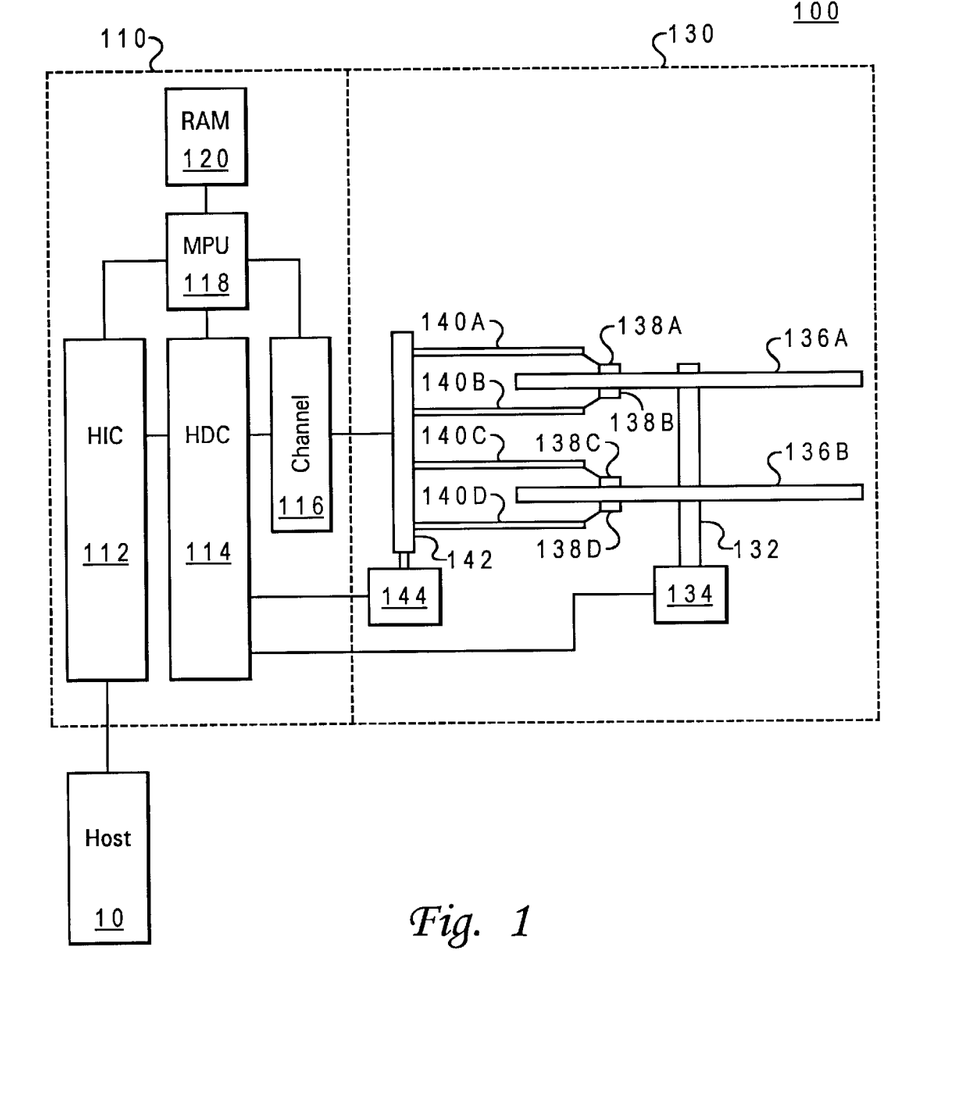
FIG. 1 is a block diagram showing a hard disk device (HDD) to which the present invention is applied.

FIG. 1 is a block diagram showing a hard disk device (HDD) to which the present invention is applied. The disk device 100 is configured by a controller portion 110 and a disk portion 130. The controller portion 110 comprises a host interface controller (HIC) 112 connected to a host system 10, a hard disk controller (HDC) 114 for controlling the disk portion, connected to the host interface controller 112, a channel 116 for controlling read and write signals, connected to the hard disk controller 114, MPU 118 connected to HIC 112, HDC 114, and channel 116 to control them, and RAM 120 connected to the MPU 118 to store microcodes executed by the MPU. The disk portion 130 is provided with a motor 134 for rotating a spindle 132. Disks 136A and 136B are attached to the spindle 132 such that they rotate integrally with the spindle 132. Although two disks are shown in the figure, the number of disks may be one or not less than three.

Heads 138A, 138B, 138C, and 138D supported respectively by actuator arms 140A, 140B, 140C, and 140D are placed so that each of them is opposed to a surface of the disk. The actuator arms 140A to 140D are attached to a voice coil motor (VCM) 144 via a pivot shaft 142, and, by its rotary motion, the head 138A to 138D are moved to desired radial positions in the disks. The motor 134 and the VCM 144 are connected to the HDC 114 to have their numbers of revolution and speeds, etc. controlled. The head 138A to 138D are connected to the channel 116 to have read and write signals controlled by the channel 116.

Figure 2A:
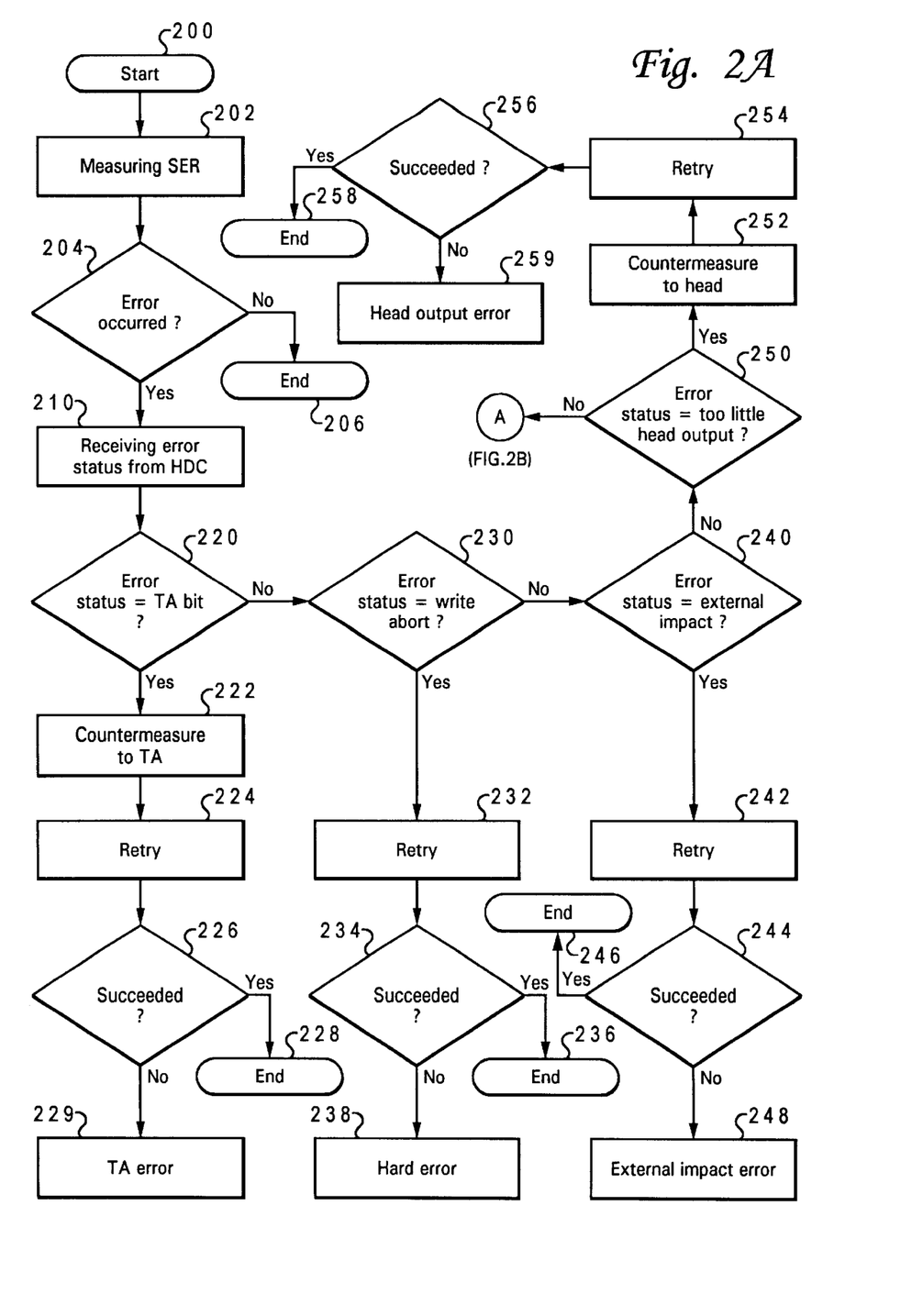
Figure 2B:
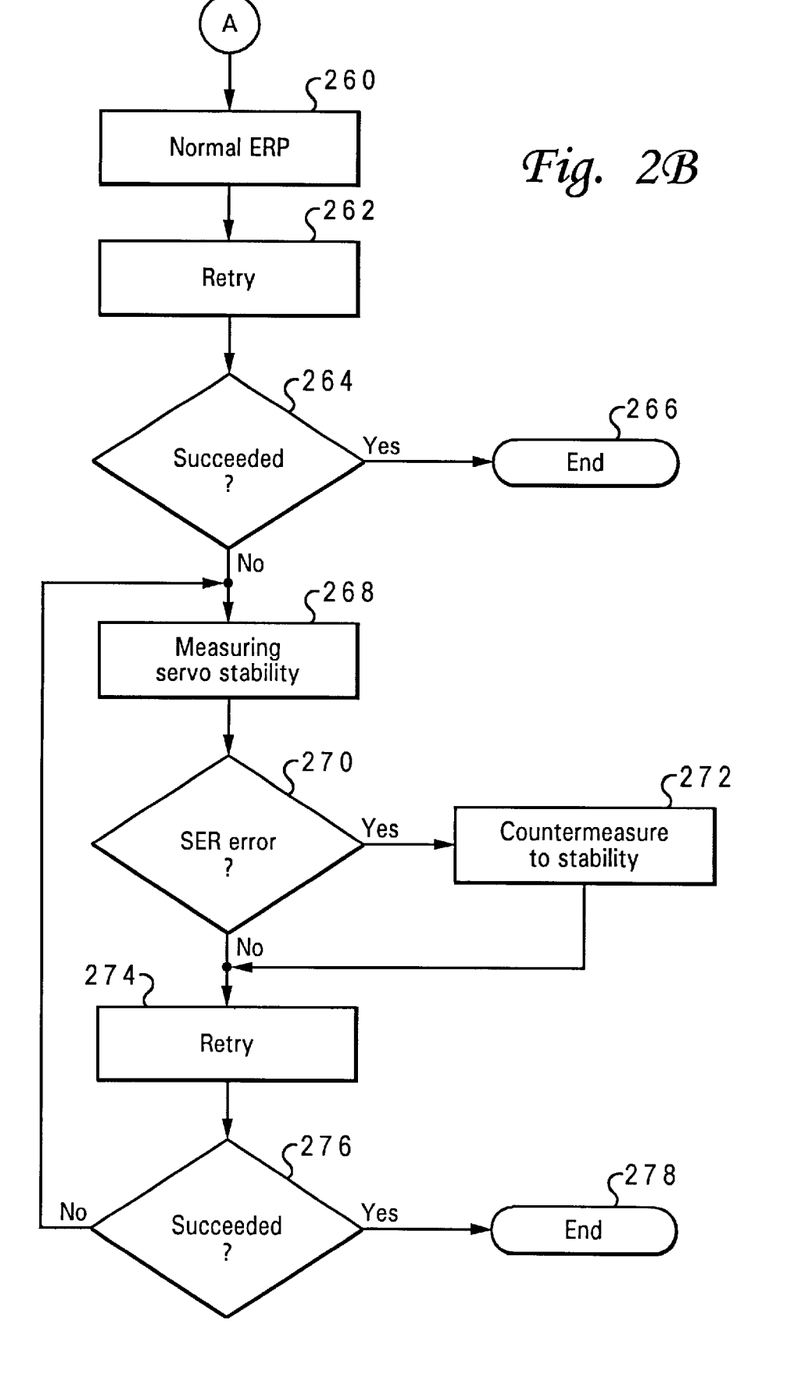

In FIG. 2 (being comprised of FIG. 2A and FIG. 2B), a process according to the present invention for executing the ERP is shown. When a read or write instruction is provided to the disk device from the host, in step 200, a read or write operation is initiated in the disk device. In step 202, an SER (soft error rate) is measured, and the result of the measurement is logged. In step 204, it is checked whether any error has occurred or not, and if no error has occurred, the process is finished in step 206. If an error has occurred in step 204, the disk device receives an error status from the HDC in step 210.

In the following steps 220, 230, 240, and 250, an ERP is selected according to the error status received in step 210. In step 220, if the error status is an error due to the TA such as a TA bit, the error is determined to be one due to the TA, and a countermeasure to TA is taken in step 222. As a countermeasure to TA, one or more error recovery steps, such as high rotational speed reading or the like are adopted. After the error recovery steps according to the countermeasure to TA are finished, a retry of reading or writing is executed in step 224. If the retry succeeds in step 226, the process is finished in step 228, and if the retry fails, a "TA error" is returned back to the host in step 229.

In the case where the error status is not the TA bit in step 220, if, in step 230, the error status is a write error such as a write abort, the error is determined to be one due to the write abort, and a retry of writing is executed in step 232. If the retry succeeds in step 234, the process is finished in step 236. If the retry fails, a "write hard error" is returned back to the host in step 238.

In the case where the error status is not the write abort in step 230, if, in step 240, the error status is an external impact error, the error is determined to be one due to the external impact, and a retry of reading or writing is executed in step 242. If the retry succeeds in step 244, the process is finished in step 246. If the retry fails, an "external impact error" is returned back to the host in step 248. Now, the external impact herein represents that when an impact is sensed by, for example, an impact sensor, an error signal is generated, and the error status is regarded as the external impact.

In the case where the error status is not the external impact in step 240, if, in step 250, the error status is a head output error such as a too little head output, the error is determined to be one due to the too little head output, a countermeasure to too little head output is taken in step 252. As a countermeasure to too little head output, one or more error recovery steps, such as low rotational speed reading and initialization of the GMR element, are adopted. After the error recovery steps according to the countermeasure to too little head output are finished, a retry of reading or writing is executed in step 254. If the retry succeeds in step 256, the process is finished in step 258. If the retry fails, a "head output error" is returned back to the host in step 259.

If, in steps 220 to 250, the error is determined not to be any of these as mentioned above, a normal ERP is executed in step 260. After the normal ERP is executed, a retry of reading or writing is executed in step 262. If the retry succeeds in step 264, the process is finished in step 266. If the retry fails, it is determined whether or not the error is due to a further cause of error in step 268. A servo stability is measured in step 268, and it is checked whether or not the cause of error is due to an instability of the positioning of the track. In step 270, it is checked whether or not the error is an SER error. If it is the SER error, the servo stability is determined to be insufficient, and a countermeasure to servo stability is taken in step 272. In the case where the error is not the SER error in step 270, or after the countermeasure to servo stability is taken in step 272, a retry of reading or writing is executed in step 274. If the retry succeeds in step 276, the process is finished in step 278. If the retry fails, the process is returned to step 268 again, and the servo stability is measured. Here, the error may be returned to the host to finish the process after a certain number of times of trial or a certain elapsed time so that the loop returning from step 276 to step 268 is not an infinite loop.

As described above, the error recovery steps in accordance with the self-diagnostic of the cause of error and the cause according to the present invention may be arranged before or after the normal ERP according to the prior art, or may be arranged to replace the normal ERP. Although an example of the error status received in steps 220 to 259 and the error recovery steps according to them is shown in this embodiment, other error status or error recovery steps may be used.

Although the case of the operation of reading or writing is explained, the present invention may also be applied to the case of a Seek operation. For example, in the case of a Settling error, the property of the filter is changed. In the case of the servo stability error, depending on whether a particular frequency component is put on it, or the stability is degraded over the whole frequency range, the corresponding frequency component is filtered, or the ERP corresponding to the degradation of the head property is executed.

Now, the measurement of the servo stability will be explained in more detail.

Figure 3:
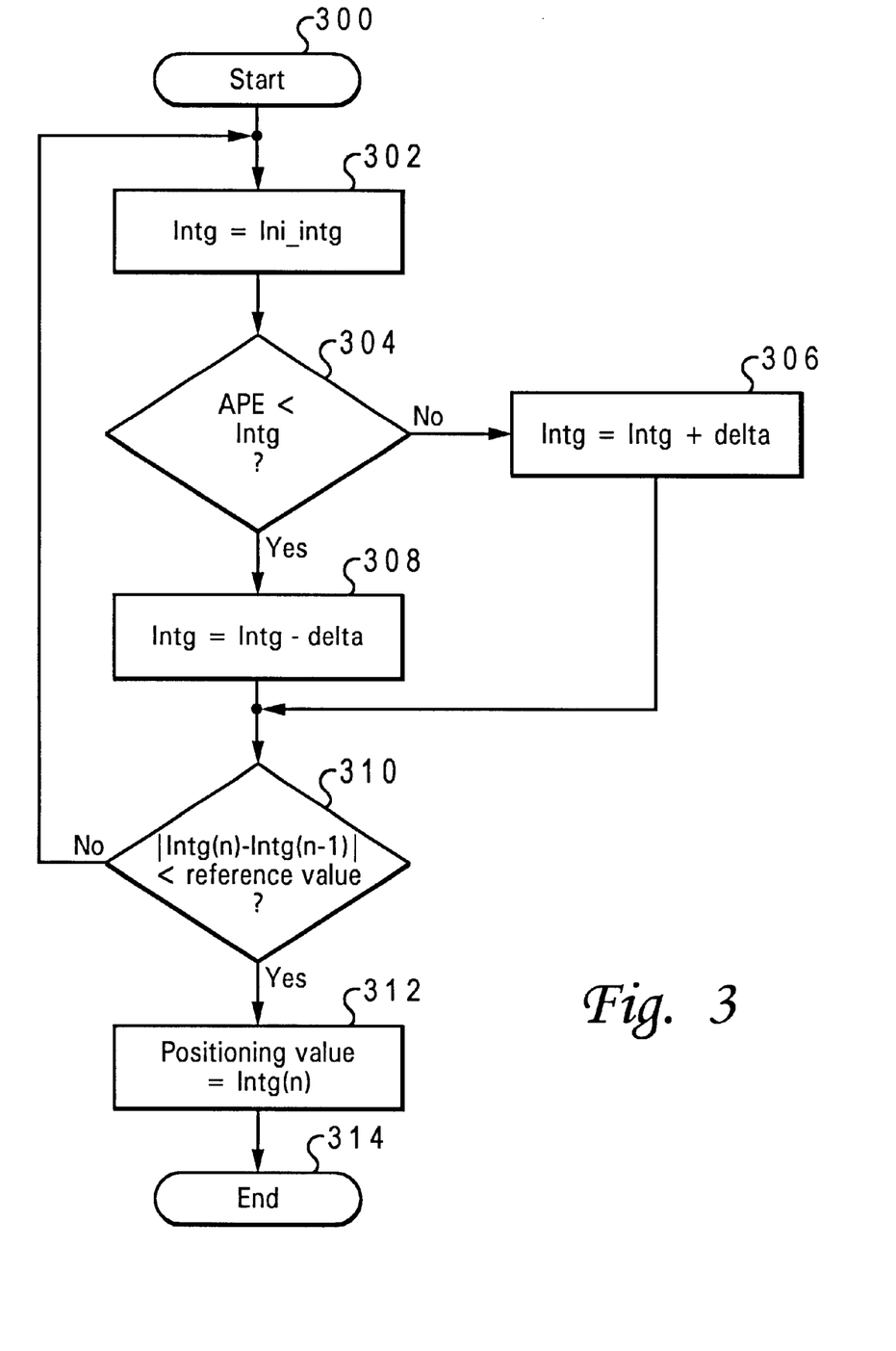
FIG. 3 shows the process for measuring the servo stability.

In FIG. 3, the measurement of the servo stability is initiated in step 300. In step 302, a value of a variable "Intg" representing the integral of the absolute value of the positioning error of the servo is initialized to a value of a constant Ini_intg. In step 304, an "APE" representing the absolute value of the positioning error is compared with the Intg. In the case where the head is deviated from the center of the track in one direction (for example, inward of the disk), the value of the Intg is greater than the APE, so the process advances to step 308, and a certain amount, delta, is subtracted from the value of the Intg. In the case where the head is deviated from the center of the track in the other direction (for example, outward of the disk), or the head is not deviated from it, the value of the Intg is smaller than or equal to the APE, a certain amount, delta, is added to the value of the Intg in step 306.

After the step 306 or 308 is finished, the process advances to step 310. The absolute value of a difference between the value of the nth integral Intg(n) and the value of the (n−1)th integral Intg(n−1) is compared with a reference value. If the absolute value of the concerned difference is smaller than the reference value, the value of integral Intg is determined to have converged, and the Intg(n) is set as the positioning value in step 312. The process is then finished in step 314. If the absolute value of the concerned difference is greater than or equal to the reference value, the process is returned to step 302. The steps 302 to 310 are then repeated until it converges. In this way, a value corresponding to the positioning value is found.

Figure 4:
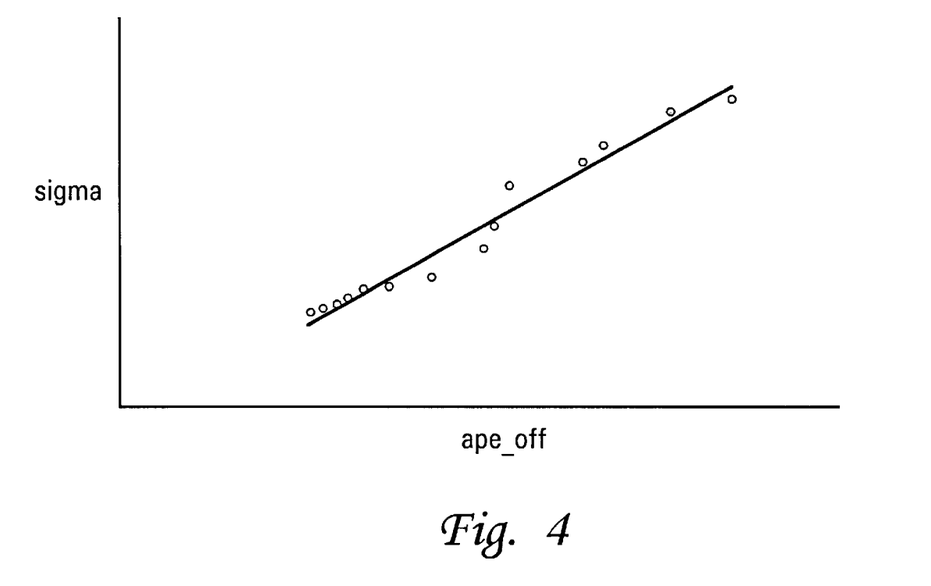
FIG. 4 shows an example of the relationship between ape_off and sigma.

In FIG. 4, an example of the relationship, which is obtained by the inventors' experiment, between the value ape_off obtained by the above-mentioned value of integral of the positioning error Intg divided by a gain and the error distribution sigma is shown. It is confirmed by this figure that there is a positive correlation between the ape_off calculated from the above positioning values and the error distribution.

Figure 5:
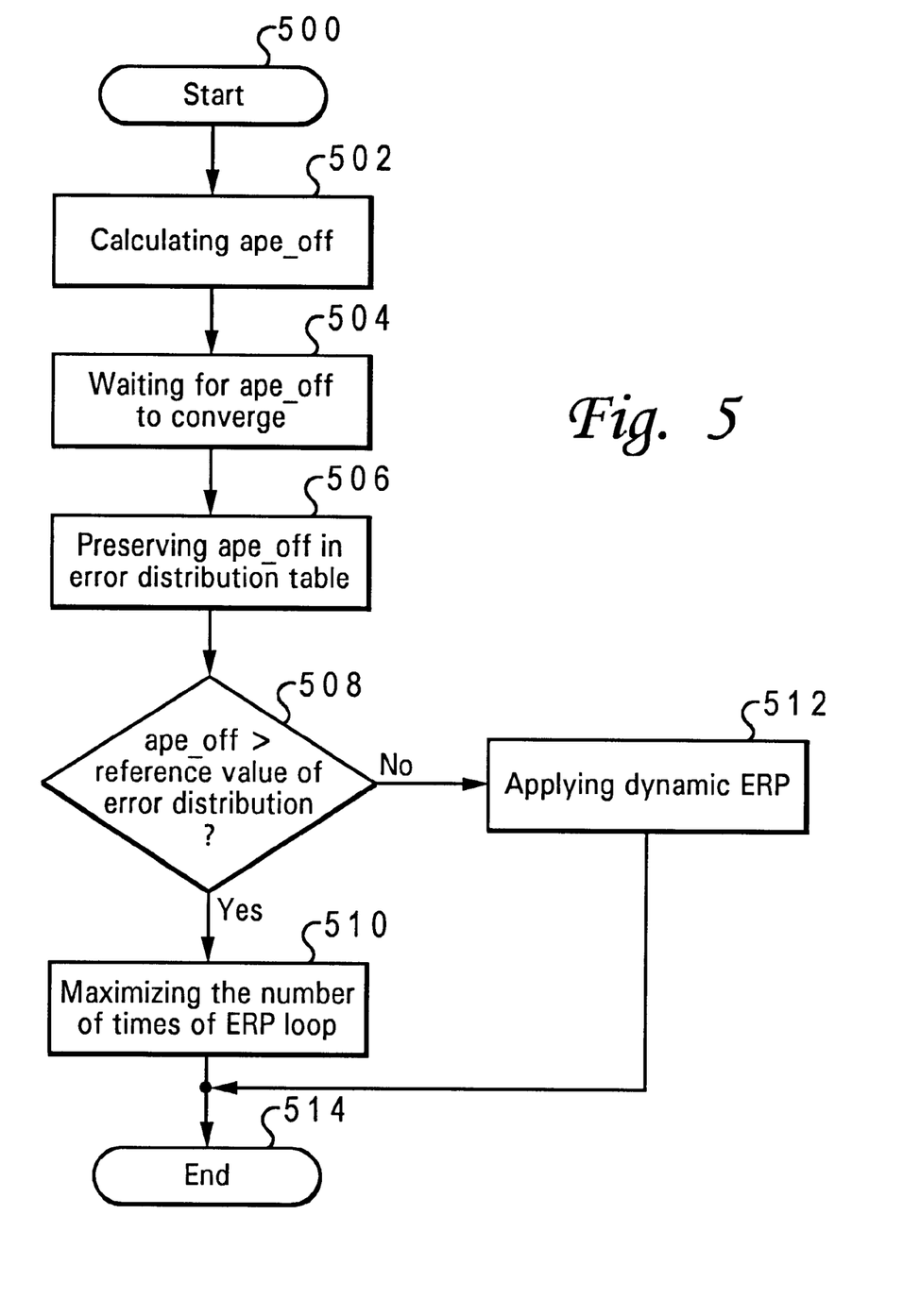
FIG. 5 shows an example of countermeasures to servo stability.

In FIG. 5, an example of the countermeasure to servo stability employing the above-mentioned correlation is shown. The process is initiated in step 500, and in step 502, the ape_off is calculated using the method as described in FIG. 3. As mentioned above, the ape_off converges to the value corresponding to the error distribution. In step 504, the process waits for the ape_off to converge. For example, in a writing ERP comprising a loop comprising a series of ERP steps, since this loop is executed one time, until the disk rotates a certain number of times (for example ten times), or a certain time elapses, the process waits for the ape_off to converge.

Next, in step 506, the value of the ape_off is preserved in an error distribution table. It is desirable to preserve this value for each head, and for each zone. In step 508, the ape_off is compared with a predetermined reference value of an error distribution, and if the ape_off is greater than it, it is determined to be the error distribution also comprising the RRO, the number of times of the loop is maximized in step 510, and the process is finished in step 514. If, in step 508, the ape_off is smaller than or equal to it, the cause of error is determined not to be the error distribution, and the dynamic ERP as shown in FIG. 2 is applied in step 512, and in the case of still not recovering from the error, after reassigning, the process is finished in step 514. In the latter case, the number of times of the ERP loop is minimized.

Figure 6:
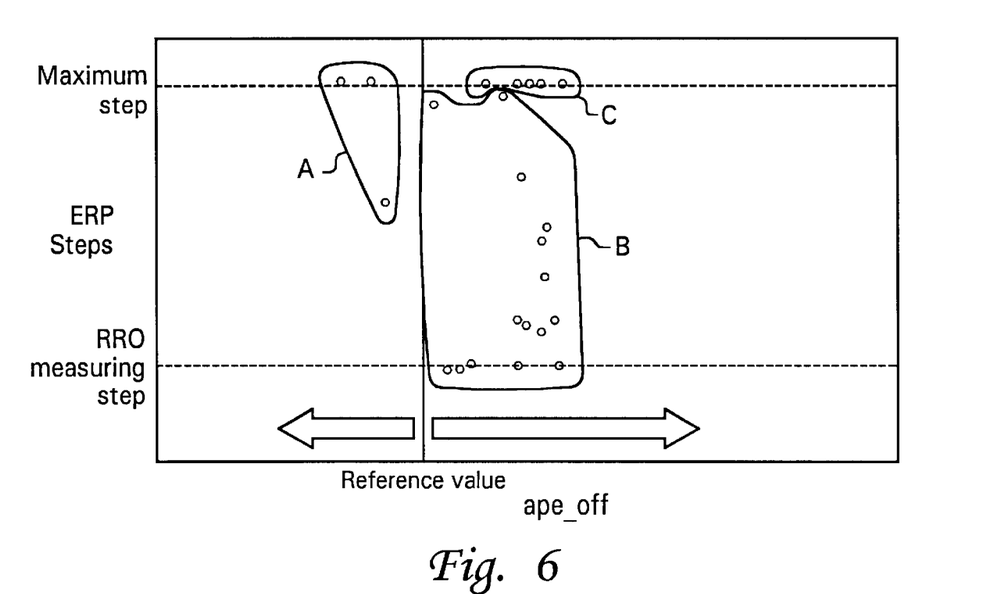
FIG. 6 shows the process for determining the optimum reference value.

In FIG. 6, the process for determining the optimum reference value in FIG. 5 is shown. In this figure, the axis of ordinates represents the number of ERP steps executed until the recovery from the error is attained, and the axis of abscissas represents the value of the ape_off. A group A has small values of the ape_off, and requires a relatively large number of the ERP steps until the recovery from the errors is attained. A group B has large values of the ape_off, and recovers from the errors with a relatively small number of the ERP steps. A group C has large values of the ape_off and reaches the maximum number of the ERP steps, so therefore the recovery from the errors is not attained and reassigning is executed.

In further analysis, the group A may be considered to have small RROs since their values of the ape_off are small, so it is considered that they are errors due to the other factors such as the TA, rather than due to the error distribution, and therefore the possibility that the recovery from the errors can be attained by executing the same ERP loop further again and again is low. On the other hand, the groups B and C, since they have large values of the ape_off, may be considered to be the errors due to the error distribution, which are greatly affected by the RRO, and therefore the possibility that the recovery from the errors can be attained by executing the same ERP loop further several times is high. Here, although the group C results in being reassigned, it is difficult to distinguish between it and the group B only by the value of the ape_off.

Therefore, as shown in FIG. 6, by defining the reference value as the value of the ape_off which divides between the group A and the groups B and C, it is possible to take a countermeasure to other errors or execute reassigning early without executing the same ERP loop for the group A further again and again, and it is expected that its performance is improved. Furthermore, with respect to the group B, the recovery from the errors can be attained by executing the same ERP loop further several times.

INDUSTRIAL APPLICABILITY:

According to the present invention, it is possible, while self-diagnosing the cause of error, to change dynamically the error recovery steps during execution of the ERP.

Also according to the present invention, it is possible to recover from the errors adequately and in a short time (with a few steps) according to the cause of error.

Furthermore according to the present invention, it is possible to eliminate the execution of the error recovery steps unsuitable for the cause of error, and prevent the degradation of the head, etc. caused by that.

Furthermore according to the present invention, it is possible to determine the cause of error.

Furthermore according to the present invention, it is possible to select whether or not to execute the ERP according to the cause of error.

Furthermore according to the present invention, it is possible, in the case of error due to a particular cause, to make the response of the disk storage device to the host system faster by reassigning without execution of the ERP.

What is claimed is:

1. A method of executing an error recovery procedure (ERP) including a plurality of error recovery steps in a storage device, comprising the steps of:

calculating a discrepancy of a positioning error;

converging said discrepancy of a positioning error;

determining that said converged discrepancy of the positioning error is greater than a predetermined reference value; and maximizing a number of times of an ERP loop.

2. The method of executing an error recovery procedure according to claim 1, wherein said step of calculating the discrepancy of the positioning error comprises the steps of:

calculating a value of an integral of the positioning error; and correcting said calculated value of an integral of the positioning error by dividing it by a gain.

3. The method of executing an error recovery procedure according to claim 1, wherein said step of converging the discrepancy of the positioning error comprises the step of waiting for a disk included in said storage device to rotate a predetermined number of times.

4. The method of executing an error recovery procedure according to claim 1, wherein said step of converging the discrepancy of the positioning error comprises the step of waiting for a disk included in said storage device to rotate for a predetermined time.

5. A method of executing an error recovery procedure (ERP) including a plurality of error recovery steps in a storage medium, comprising the steps of:

calculating a discrepancy of a positioning error;

converging said discrepancy of the positioning error;

determining that said converged discrepancy of the positioning error is not greater than a predetermined reference value; and minimizing a number of times of an ERP loop.

6. A device for executing an error recovery procedure (ERP) including a plurality of error recovery steps, comprising:

means for calculating a discrepancy of a positioning error;

means for converging said discrepancy of the positioning error;

means for determining that said converged discrepancy of the positioning error is greater than a predetermined reference value; and means for maximizing a number of times of an ERP loop.

7. A device for executing an error recovery procedure (ERP) including a plurality of error recovery steps, comprising:

means for calculating a discrepancy of a positioning error;

means for converging said discrepancy of the positioning error;

means for determining that said converged discrepancy of the positioning error is not greater than a predetermined reference value; and means for minimizing a number of times of an ERP loop.

* * * * *